United States Patent
Gilliam

(10) Patent No.: US 9,715,677 B2
(45) Date of Patent: Jul. 25, 2017

(54) CONDITIONAL ADVERTISING FOR INSTANT MESSAGING

(75) Inventor: Orey Gilliam, Raanana (IL)

(73) Assignee: AOL Inc., Dulles, VA (US)

( * ) Notice: Subject to any disclaimer, the term of this patent is extended or adjusted under 35 U.S.C. 154(b) by 1906 days.

(21) Appl. No.: 11/781,484

(22) Filed: Jul. 23, 2007

(65) Prior Publication Data

US 2008/0147501 A1 Jun. 19, 2008

Related U.S. Application Data

(60) Provisional application No. 60/870,036, filed on Dec. 14, 2006, provisional application No. 60/938,038, filed on May 15, 2007.

(51) Int. Cl.
G06Q 30/00 (2012.01)
G06Q 10/10 (2012.01)
G06Q 30/02 (2012.01)

(52) U.S. Cl.
CPC .......... *G06Q 10/107* (2013.01); *G06Q 30/02* (2013.01); *G06Q 30/0269* (2013.01)

(58) Field of Classification Search
CPC ................................................ G06Q 30/0269
USPC ......................................................... 705/14
See application file for complete search history.

(56) References Cited

U.S. PATENT DOCUMENTS

| | | | |
|---|---|---|---|
| 2002/0072965 A1* | 6/2002 | Merriman et al. | 705/14 |
| 2004/0186766 A1* | 9/2004 | Fellenstein et al. | 705/14 |
| 2006/0004630 A1* | 1/2006 | Criddle et al. | 705/14 |
| 2006/0129455 A1* | 6/2006 | Shah | 705/14 |

* cited by examiner

*Primary Examiner* — Mario C Iosif
(74) *Attorney, Agent, or Firm* — Finnegan, Henderson, Farabow, Garrett & Dunner LLP

(57) ABSTRACT

An instant message sender user interface for an instant messaging communications session involving an instant message sender and an instant message recipient is rendered, the user interface including a conversation window. User input is entered by the instant message sender through manipulation of the user interface, the user input including data for transmission as an instant message from the instant message sender. An instruction by the instant message sender to send the data to the instant message recipient based on manipulation by the instant message sender of the user interface is resolved. Display of advertising content on the user interface is triggered responsive to the instruction by the instant message sender to send the data to the instant message recipient. The advertising content is displayed in the conversation window during at least a portion of the time that the instant message sender awaits a reply from the instant message recipient.

53 Claims, 9 Drawing Sheets

CONDITIONAL ADVERTISING FOR INSTANT MESSAGING

This application claims the benefit of U.S. Provisional Application No. 60/870,036, filed on Dec. 14, 2006, and U.S. Provisional Application No. 60/938,038, filed on May 15, 2007, both of which are incorporated herein by reference in their entirety.

FIELD

This disclosure generally relates to instant messaging, and at least one particular implementation relates to the conditional display of advertising content in an instant messaging communications system.

BACKGROUND

Using on-line instant messaging services, computers users can participate in conversations with each other by sending and receiving instant messages. Such conversations are sometimes displayed within a conversation window of an instant messaging graphical user interface. Instant messaging services sometimes generate advertising revenue by displaying banner advertisements on portions of the instant messaging graphical user interface outside of the conversation window.

SUMMARY

According to one general implementation, a computer-implemented method for displaying advertising content in an instant messaging user interface includes rendering an instant message sender user interface for an instant messaging communications session involving an instant message sender and an instant message recipient, the instant message sender user interface including a conversation window configured to display instant messages communicated from the instant message recipient. Data for transmission as an instant message from the instant message sender is received from user input entered by the instant message sender through manipulation of the instant message sender user interface. An instruction by the instant message sender to send the data to the instant message recipient based on manipulation is resolved by the instant message sender of the instant message sender user interface. Responsive to the instruction by the instant message sender to send the data to the instant message recipient, display of advertising content on the instant message sender user interface is triggered. The advertising content is displayed in the conversation window during at least a portion of the time that the instant message sender awaits receipt of a reply from the instant message recipient.

Implementations may include one or more of the following features. The advertising content may be displayed independently of the instant messages. Displaying the advertising content independently of the instant messages may include displaying the advertising content in a first portion of the conversation window and displaying the instant messages in a second portion of the conversation window. Displaying the advertising content independently of the instant messages may include displaying the advertising content out-of-line with the instant messages. The advertising content for display in the conversation window may be selected based on content within the user input to be transmitted. An instant message communicated from the instant message recipient may be received, and the displayed advertising content may be altered based on receiving the instant message communicated from the instant message recipient. Altering the displayed advertising content may include locating the advertising content in another portion of the conversation window. Altering the displayed advertising content may include changing the form of the advertising content. Altering the displayed advertising content comprises removing the advertising content from the conversation window.

In another example, receiving an instant message communicated from the instant message recipient may be received, and the advertising content may be displayed in the conversation window based on receiving the instant message communicated from the instant message recipient. The advertising content may include at least first and second images, and displaying the advertising content may include displaying the first image, and replacing the first image with the second image. The first image may larger than the second image. Replacing the first image with the second image may occur within ten seconds of displaying the first image. The communications session may be terminated, and the second image may be removed from display based upon terminating the communications session.

In another example, the advertising content may include at least one transparent image. The advertising content may be animated advertising content. The advertising content and the data may be transmitted to the instant message recipient, and the advertising content and the data may be displayed at an instant message recipient user interface. The advertising content displayed in the conversation window may obscure at least a portion of the instant messages communicated from the instant message recipient. A context of the advertising content may be based upon a context of the data or an attribute stored in a user profile associated with the instant message sender. Displaying the advertising content may include transmitting the data to an intermediary server, determining a context of the data at the intermediary server, selecting the advertising content at the intermediary server based upon the context of the data, and transmitting the advertising content from the intermediary server to the instant message sender. The advertising content may be determined at the intermediary server based upon an attribute stored in a user profile associated with the instant message sender, and the advertising content may be transmitted from the intermediary server to the instant message sender. An attribute stored in a user profile associated with the instant message sender may be transmitted to the intermediary server, and the attribute may be received at the intermediary server such that the advertising content is determined based on the attribute. A user profile stored on the intermediary server may be accessed, and the attribute may be retrieved from the user profile, where the advertising content is determined based on the retrieved attribute.

In another example, a counter may be incremented based upon generating the advertising content, and content to display as the advertising content may be selected based upon the counter. A user input selecting the advertising content may be received. The user input selecting the advertising content may include receiving a mouse click on the advertising content. The advertising content may expand within the conversation window based upon receiving the user input selecting the advertising content. A browser may be directed to an address associated with the advertising content based upon receiving the user input selecting the advertising content. A counter may be incremented based upon receiving the user input selecting the advertising content, a number of selections of the advertising content may be determined based on the counter, and the determined number may be sent to a provider of the advertising content.

In yet another example, a user input to remove the advertising content from the conversation window may be received, and the advertising content may be removed from display in response to receiving the user input. A set of selectable options related to the display of advertising content may be presented, the set of options including an option to remove the advertising content from the conversation window. The display of advertising content may be prevented in subsequent instant messaging communications sessions based on the received user input. The set of options may be presented before the advertising content is displayed in the conversation window. The set of options may be presented after the advertising content is displayed in the conversation window. The set options is presented before the advertising content is displayed. The set of options may be presented after the advertising content is generated. A banner advertising content may be displayed on the instant message sender user interface. The conversation window may be configured to display instant messages communicated from the instant message sender.

This brief summary has been provided to enable a quick understanding of various concepts and implementations described by this document. A more complete understanding can be obtained by reference to the following detailed description in connection with the attached drawings. It is to be understood that other implementations may be utilized and changes may be made. Implementations of any of the techniques described above may include a method or process, an apparatus or system, or computer software on a computer-accessible medium. The details of particular implementations are set forth in the accompanying drawings and description below. Other features will be apparent from the following description, including the drawings, and the claims.

DESCRIPTION OF DRAWINGS

Like reference numbers represent corresponding parts throughout.

DETAILED DESCRIPTION

Figure 1A:
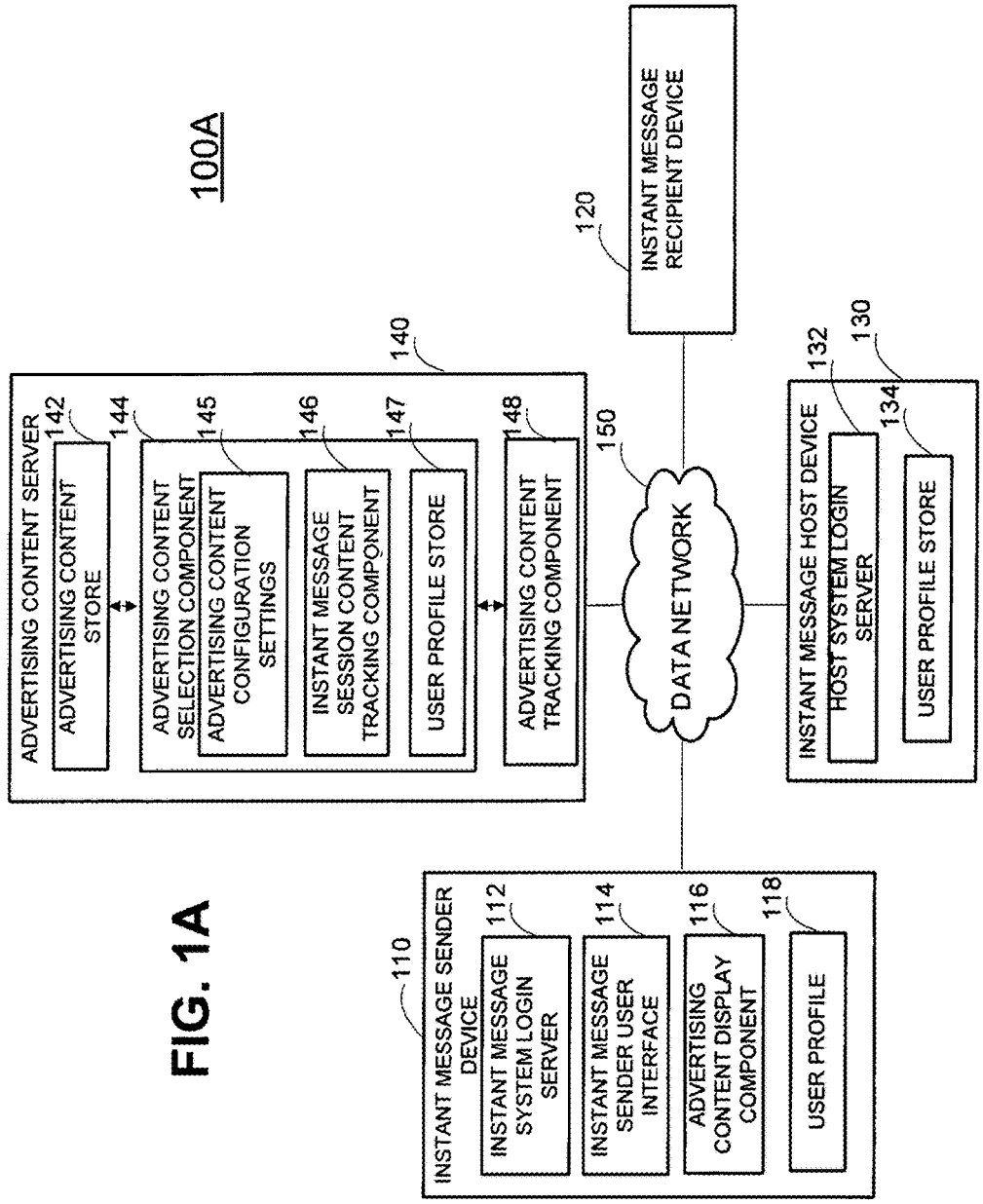
FIG. 1A is a block diagram illustrating an exemplary communications system.

Techniques are provided for using conditional advertising with instant messaging applications, such that the display of advertising content is controlled based on whether a target audience is available for exposure. For example, the advertising content may be displayed in the conversation window of an instant message window, with display of the advertising content being triggered by the transmission of a message by an instant messaging session participant.

By 'conditional advertising,' it is intended that the advertising content is displayed 'conditioned' upon the target audience believed to be available for exposure, and that the advertising content is displayed in a location where the target audience is expected to view. To better predict the availability of the target audience for exposure, instant messaging activity may be monitored. Thus, the display of the advertising content may be triggered by the transmission of an instant message. Placing the advertising content in the conversation window at the time of message transmission increases the chance that the transmitting user will absorb the advertising content, because the transmitting user's attention is focused on the conversation window as they are actively engaged in the instant messaging session, awaiting a reply to a message just sent. More generally, advertising content is placed in a location where the sender is expecting the message recipient's response at a time when the response is expected.

The conversation window is the portion of the instant messaging user interface that displays the dialog exchanged between an instant message sender and an instant message recipient. Depending upon the particular graphical user interface selected, other regions or windows may also be displayed in the instant messaging user interface. For example, a composition window may be displayed as the portion of the user interface where the instant message sender enters a message to send to the instant message recipient. In some implementations, the conversation window displays the entire dialog between the instant message sender and the instant message recipient. Thus, the conversation window may include instant messages sent by the instant message sender and instant messages received by the instant message recipient.

In other user interfaces, the conversation window merely includes instant messages sent to the instant message sender. As such, the full dialog between the instant message sender and the instant message recipient for the instant messaging session may be determined by reading the content of the composition window, together with the content of the conversation window.

An instant messaging session may be an exchange of at least one instant message by either an instant message sender or an instant message recipient. Regardless of whether the dialog is perceived by an intended recipient, the sending of an instant message is itself sufficient to constitute an exchange for purposes of this disclosure. The instant message sender's attention is focused on the conversation window for a time after the sender transmits an instant message to the instant message recipient while the sender waits for the recipient's response message and this disclosure recognizes such focus as an opportunity to make an impression. Of course, other such opportunities also are contemplated as well.

FIG. 1A illustrates a communications system 100A including an instant messaging sender device 110 that is capable of delivering and exchanging data with an instant message recipient device 120, an instant message host device 130, and an advertising content server 140 through a data network 150. Briefly, the instant message sender device 110 is configured to render an instant message sender user interface for an instant messaging communications session involving an instant message sender and an instant message recipient, the instant message sender user interface including a conversation window configured to display instant messages communicated from the instant message recipient, and to receive a user input accepting data for transmission as an instant message, from the instant message sender. The instant message sender device 110 is also configured to transmit the data to an intermediary server, such as instant message host device 130, to generate advertising content based upon receiving the user input, and to display the advertising content in the conversation window. The instant message host device 130 is configured to determine a context of the data at the intermediary server, to determine the advertising content at the intermediary server based upon the context of the data, and to transmit the advertising content from the intermediary server to the instant message sender device 110.

In more detail, the instant message sender device 110 includes an instant message system login 112, an instant message sender user interface 114, an advertising content display component 116, and a user profile 118. The instant message sender device 110 is configured to render an instant message sender user interface for use in an instant messaging communications session involving an instant message sender and an instant message recipient. The login 112 allows an instant message sender (or recipient) to log in to or authenticate with the instant message host device 130 from the sender's client machine. The login 112 includes instructions that identify an instant message user's user number or screen name and password. The login server sends instructions to the instant message host device 130 that allow the instant message user to access the instant message host device 130.

The instant message user interface includes a conversation window that is configured to display instant messages communicated from the instant message recipient. The instant message sender device 110 is also configured to receive a user input that accepts data for transmission as an instant message, and to transmit the data to an intermediary server, such as, for example, instant message host device 130 or the advertising content server 140. The instant message sender device 110 is also configured to generate advertising content based on the received user input, and to display the advertising content in the conversation window of the instant message sender user interface.

The instant message system login 112 enables an instant message sender to log in to or authenticate with the instant message host device 130. The instant message sender device 110 also includes an instant message sender user interface 114 that is displayed to the instant message sender on the instant message sender device 110. The instant message sender user interface 114 enables the instant message sender to compose, transmit, and view instant messages that the instant message sender transmits to an instant message recipient. The instant message sender user interface 114 also enables the instant message sender to receive instant messages.

The instant message sender device 110 also includes an advertising content display component 116 configured to display advertising content in the conversation window of the instant message sender user interface 114. The advertising display component 116 may be part of the instant messaging application, or it may be a stand-alone program. The advertising content display component 116 may receive advertising content from the instant message host device 130 or the advertising content server 140, or the advertising content display component 116 may retrieve advertising content stored locally on the instant message sender device 110 and display the retrieved advertising content in the conversation window of the instant message sender user interface 114. Alternatively, the instant message sender device 110 may generate advertising content itself.

The instant message sender device 110 also may include a user profile 118 associated with the user or users logged into the instant messaging device through the instant message system login 112. The user profile 118 may include preferences set by the user, such as, for example, wallpaper settings and the user's buddy list, or settings related to the advertising content display component 116. Settings related to the advertising content display component 116 may include an indication that the user prefers or does not prefer to see advertising content for certain types of products. Additionally, the user profile 118 may include a setting that indicates the maximum number of times the user wants to see a particular advertising content, as measured by a counter, or information related to the user's demographic characteristics such as the user's age and gender. Information stored in the user profile 118 may be used to select advertising content to display in the conversation window of the instant message sender user interface 114.

In a further example, the user profile 118 also may include settings determined by the instant message sender device 110 or the instant message host system 130. For example, the user profile 118 may indicate how often the user has selected a particular displayed advertising content, as measured by a different counter. In another example, the user profile 118 may indicate the number of times a particular advertising content has been displayed in the user's instant messaging user interface, and/or the time since the advertising content was displayed. Although the user profile 118 has been described as being stored locally on the instant message sender device 110, in other implementations the user profile may be wholly or partially stored on all, or any, of the instant message sender device 110, the instant message host device 130, the advertising content server 150, or another device.

The communications system 100A also includes an instant message recipient device 120. The instant message recipient device 120 may include features and characteristics similar to those described above with respect to the instant message sender device 110. For example, the instant message recipient device 120 may include a user profile that includes information associated with the user who is logged in to the communications system 100A through the instant message recipient device 120. Although instant message sender device 110 and instant message recipient device 120 have been respectively described in the context of sending and receiving messages, instant message sender device 110 may also be the recipient of instant messages sent from instant message recipient device 120, or other devices.

The communications system 100A also includes an instant message host device 130. Instant messages sent between the instant message sender and recipient may pass through the host device 130. The host device 130 includes a host system login server 132 and may also include a user profile store 134. The host system login server 132 is configured to enable an instant message session participant to log in to the host device 130. The user profile store 134 includes user profiles for multiple users who log into the host device 130. The user profiles included in the user profile store may include data similar to that included in the user profile 116 described above.

The instant message host device 130 monitors the frequency of occurrence with which a particular user has been exposed to an advertising content. Using this frequency information, advertisers can limit the number of exposures a particular user has to advertising content. The host device 130 also may monitor the success of the advertising content by, for example, monitoring the number of times users click on the advertising content. The instant message host device 130 may also be referred to herein as a centralized server, or an intermediary server.

In addition to or instead of passing through the host device 130, instant messages communicated between an instant message sender and an instant message recipient also may pass through an advertising content server 140. The advertising content server 140 includes an advertising content store 142, an advertising content selection component 144, and an advertising content tracking component 148. The advertising content selection component may include advertising content configuration settings 145, an instant message session content tracking component 146, and a user profile store 147. The advertising content server 140 selects and provides advertising content to the instant message sender device 110 after the instant message sender transmits an instant message. The advertising content server 140 may be located on, or even replace the instant message host device 130.

The advertising content server 140 includes an advertising content store 142 configured to store the advertising content that is transmitted to the instant message sender device 110 for display in the instant message sender user interface 114. The advertising content store 142 may include various types of data, for example, images, video, text, or advertising content that includes a combination of various types of data. The advertising content store 142 may be implemented as a database.

Images stored in the advertising content store 142 may include, for example, transparent images and animated images. A particular item of advertising content may include more than one image and/or more than one type of content. For example, an item of advertising content may include image, sound, and textual data. In another example, an item of advertising content may include multiple images. Additionally, the advertising content store 142 may store advertising content associated with multiple providers. Transparent images are those which allow a user to perceive at least a portion of the background image, text or other background objects displayed behind the transparent image. For example, an image or image overlay which merely highlights existing displayed images or text would be considered a transparent image.

The advertising content server 140 also includes an advertising selection component 144. The advertising selection component 144 is configured to select an item, or items, of advertising content to send to the instant message sender device 110. The advertising selection component 144 may include advertising content configuration settings 145, an instant message session content tracking component 146, and a user profile store 147.

Configuration settings related to the advertising content store 142 may be stored in the advertising configurations settings 145. The advertising configuration settings 145 may include settings for advertising content stored in advertising content store 142, such as advertising content associated with a particular provider. For example, the advertising configuration settings may include a setting indicating that advertising content associated with a particular business not be transmitted to the same user more than five times in a week-long period. By reducing the transmission of advertising content, the viewer's exposure to and absorption of the advertising content may increase. The advertising content configuration settings 145 may be specified by a provider associated with the advertising, or they may be specified by a service provider who hosts the instant message communications session.

The advertising content selection component 144 also may include an instant message session content tracking component 146. The instant message content tracking component 146 may be configured to analyze the instant messages sent between the instant message sender and recipient during a communications session. Once the content is analyzed, the advertising selection component 144 may select advertising content from the advertising content store 142 that is related to the content of the instant messages. In some implementations, the content of the instant messages may be determined by analyzing the messages for predetermined key words.

The advertising content selection component 142 also may include a user profile store 147. The user profile store 147 may include data similar to the data stored in the user profile store 118 and/or the user profile store 134. For example, the user profile store 147 may indicate how many times an instant message recipient has received particular advertising content. In another example, the user profile store 147 may include the demographic information of a particular user or information related to the user's interests. This data also may be used to select advertising content of interest to the instant message sender from the advertising content store 147. In another example, the user profile store 147 may include settings indicating products or services that a particular user prefers.

To track the distribution of advertising, the advertising content server 140 also includes an advertising content tracking component 148. The advertising content tracking component 148 monitors the reaction of the instant messaging participants to the advertising content sent by the advertising content server 140 and provides this information to the provider of the advertising content. For example, the advertising content tracking component 148 may track the number of times participants select particular advertising content. The advertising content tracking component 148 also may monitor how many times a particular advertising content has been sent to an instant message sender, using a counter.

The data network 150 provides direct or indirect communication between the instant message sender device 110, the instant message recipient device 120, the instant message host device 130, and the advertising content server 140. Examples of the data network 150 include the Internet, the World Wide Web, WANs, LANs, analog or digital wired and wireless telephone networks, cable networks, Integrated Services Digital Network (ISDN), and Digital Subscriber Line (DSL), radio, satellite systems, and any other delivery mechanism for carrying data.

Figure 1B:
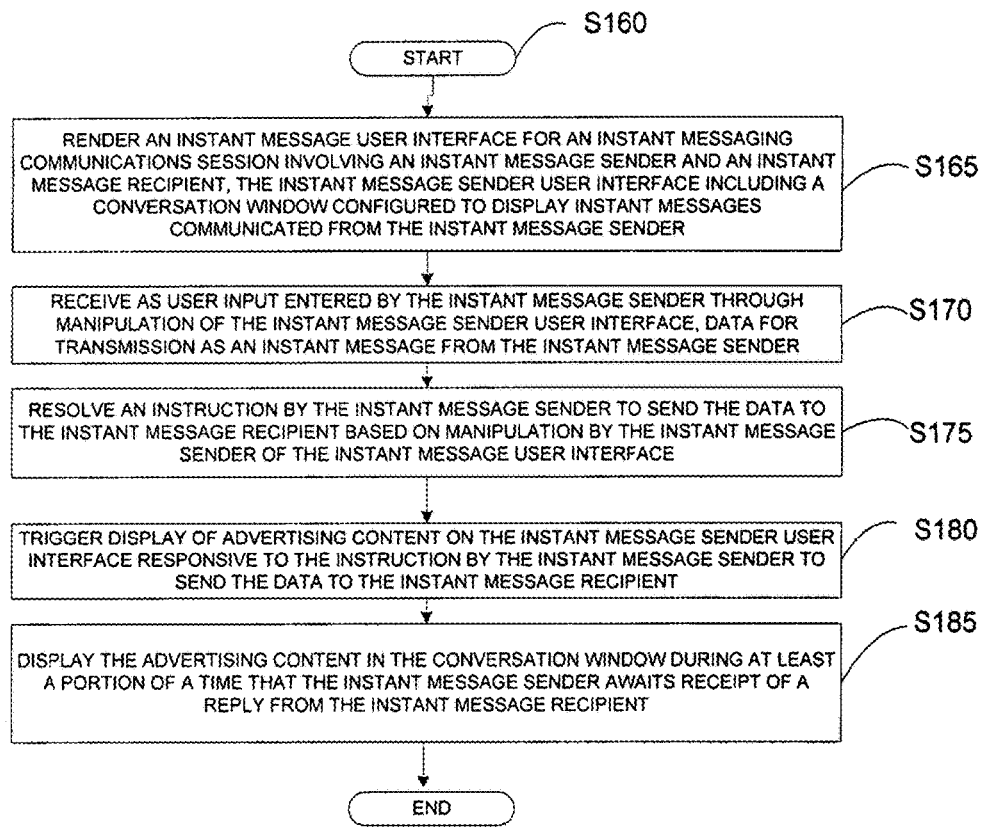
FIG. 1B is a flowchart depicting an exemplary process for displaying advertising content in the conversation window of an instant messaging user interface.

FIG. 1B is a flowchart depicting an example process 100B for displaying advertising content in the conversation window of an instant messaging user interface when an instant message sender is likely to be available to view the advertising content. The process 100B may be performed by one or more processors in a system, such as, for example, the instant message sender device 110 described above with respect to FIG. 1. The process 100B begins (S160) when an instant message sender user interface for an instant messaging communications session involving an instant message sender and an instant message recipient is rendered (S165). The instant message sender user interface includes a conversation window that is configured to display instant messages communicated from the instant message recipient. The process 100B continues when the processor receives, as user input entered by the instant message sender through manipulation of the instant message sender user interface, data for transmission as an instant message, from the instant message sender (S170).

The process 100B continues when the processor resolves an instruction by the instant message sender to send the data to the instant message recipient based on manipulation by the instant message sender of the instant message sender user interface (S175). The process 100B also includes triggering the display of advertising content on the instant message sender user interface responsive to the instruction by the instant message sender to send the data to the instant message recipient, triggering (S180). Advertising content is then displayed in the conversation window during at least a portion of the time that the instant message sender awaits receipt of a reply from the instant message recipient (S185). Additionally, the processor may receive a reply or response from the instant message recipient. The displayed advertising content may be changed in form, moved to a different location within the conversation window, or removed from the conversation window altogether in response to receiving a reply from the instant message recipient.

Figure 2:
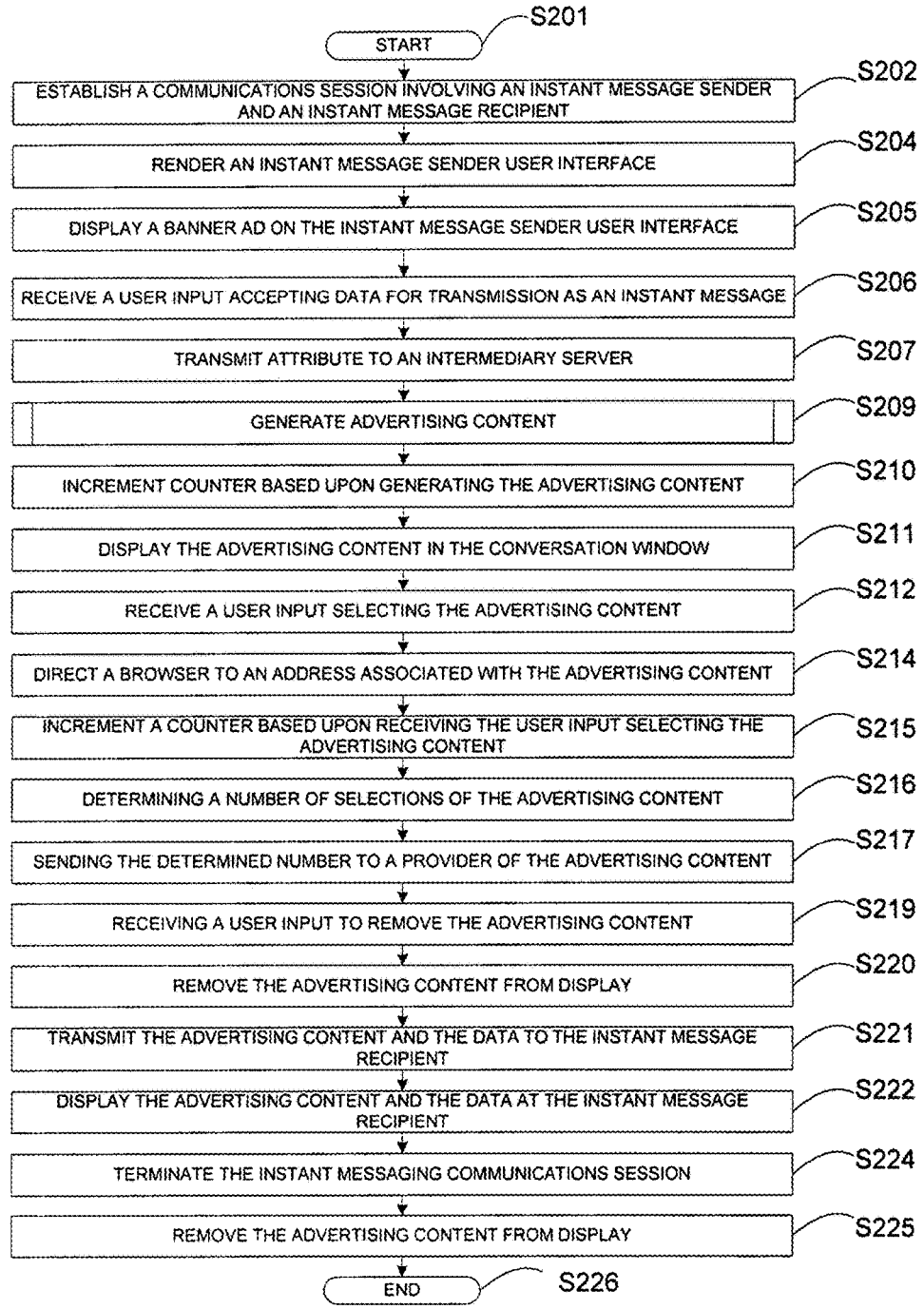
FIG. 2 is a flowchart depicting an exemplary process for displaying advertising content in the conversation window of an instant messaging user interface.

FIG. 2 is a flowchart depicting an example process 200 for displaying advertising content in the conversation window of an instant messaging user interface when an instant message sender is available to view the advertising content. Briefly, the process 200 includes, among other things, rendering an instant message sender user interface for an instant messaging communications session involving an instant message sender and an instant message recipient, the instant message sender user interface including a conversation window configured to display instant messages communicated from the instant message recipient, receiving a user input accepting data for transmission as an instant message, from the instant message sender, generating advertising content based upon receiving the user input, and displaying the advertising content in the conversation window independently of the instant messages. The process 200 may be performed by one or more processors in a system, such as, for example, the instant message sender device 110 described above with respect to FIG. 1.

In more detail, process 200 begins (S201) when an instant messaging communication session involving an instant message sender and instant message sender is established (S202). An instant message sender user interface is rendered for the instant messaging communications session, the instant message sender user interface including a conversation window configured to display instant messages communicated from the instant message recipient (S204). The instant message sender user interface may be rendered, for example, on the instant message sender device 110.

Figure 3:
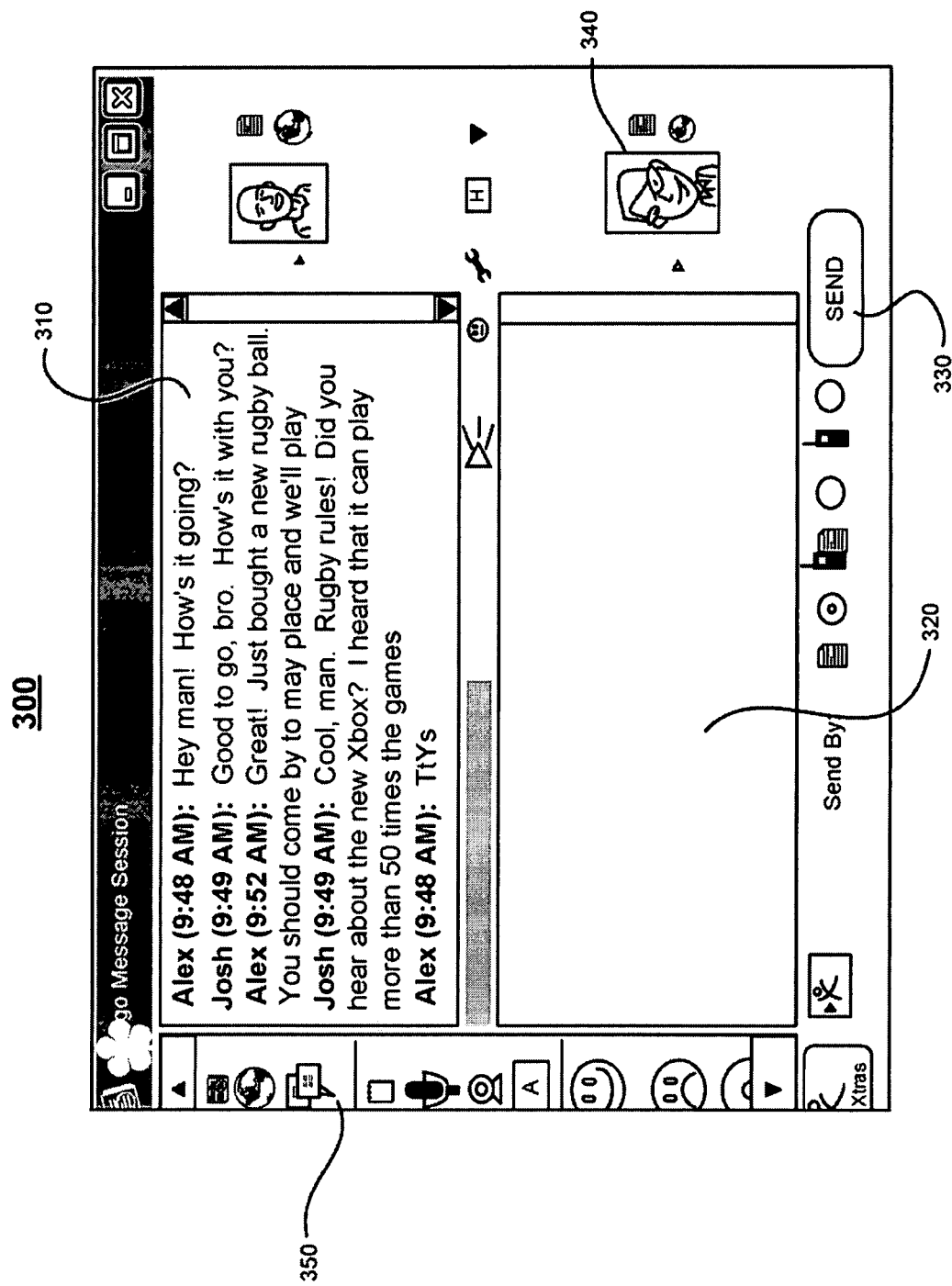
FIGS. 3 and 5 illustrate exemplary instant message sender user interfaces.

FIG. 3 illustrates an example instant message sender user interface 300, which includes a conversation window 310, a composition window 320, and a send control 330. The conversation window 310 displays instant messages from both the instant message sender and the instant message recipient. In other examples, the conversation window 310 may include messages from the instant message recipient, but not the instant message sender. In the example shown in the instant messaging user interface 300, the instant messages include data. However, in other examples, the instant messages also may include other types of data, such as, for example, graphical data similar to emoticons. In some implementations, the instant message also may include advertising content.

The interface 300 also includes a composition window 320. The instant message sender may compose instant messages in the composition window 320 and view them prior to sending the instant message to the instant message recipient. The interface 300 also includes the control 330, the selection of which enables the instant message sender to accept data for transmission as an instant message. The instant message sender may select the control 330 using a mouse or other pointing device. In other implementations, the instant message sender may accept data for transmission as an instant message by selecting a key on a keyboard after entering the data. In on example, the user accepts data for transmission as an instant message by typing the message, and selecting the ENTER key.

The instant message sender user interface 300 may also include many other useful features, such as icon 340 and controls 350. The icon 340 may display a user-selected image or avatar, for example to represent the user's actual or on-line identity. The controls 350 may allow the user to establish, terminate or otherwise manage the instant messaging communications session, for example to allow the user to transfer files between session participants. Although the instant message sender user interface 300 is described in the context of the instant message sender, the instant message recipient also uses a user interface which may have similar features.

Returning to FIG. 2, other information, such as banner advertising, may also be displayed on the instant message sender user interface (S205). A user input is received accepting data for transmission as an instant message from the instant message sender (S206). For example, the user input accepting data for transmission may occur when the user selects the send button on the graphical instant messaging interface using a mouse, or other pointing device. In another example, the user may select the send button using a keyboard. In still another example, the user input may be a keyboard selection made after the user enters the data for transmission. Data for transmission as an instant message may include, for example, textual data, graphical data, or both.

According to one implementation, a user profile associated with the instant message sender may be used to select advertising content relevant to the instant message sender. For example, the user profile may include user attributes such as a user's favorite products or services, or user attributes such as the maximum number of times that particular advertising content is to be delivered to a user during a preset temporal period or that particular advertising content is to be delivered to a user every fifth time the user participates in an instant messaging session. In this implementation, the attribute may be transmitted to the intermediary server for further processing (S207). In other implementations, such as where the attribute is not used to select the adverting content, or where the attribute information is already stored at the intermediary server, the attribute information is not transmitted from the instant message sender.

The process 200 also includes generating advertising content based upon receiving the user input (step 209). Generating the advertising content may include receiving the advertising content. The advertising content may be received with an instant message or it may be received separate from the instant message.

Figure 4:
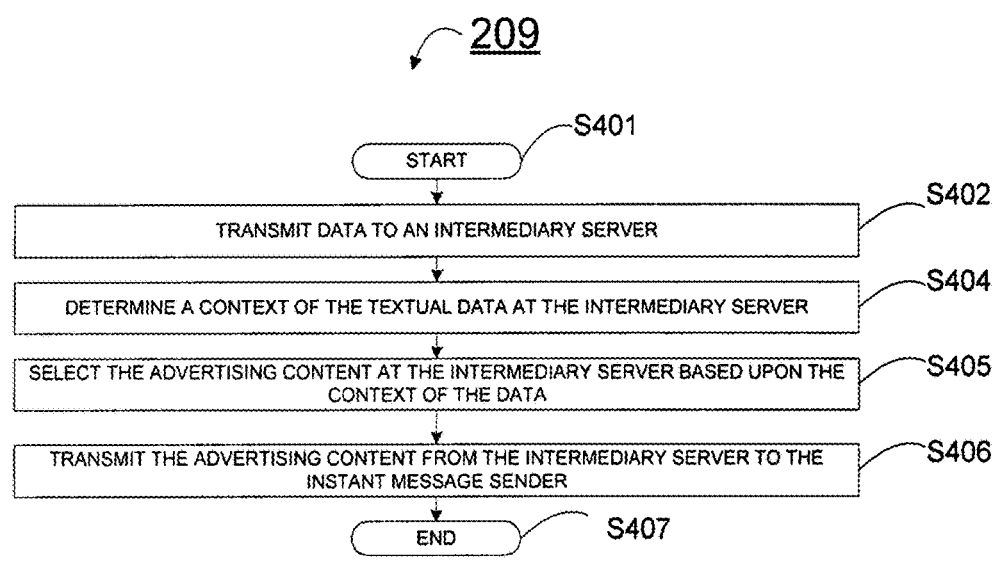
FIG. 4 illustrates an exemplary process for generating advertising content.

FIG. 4 illustrates an implementation of process 209 for generating advertising content. When process 209 begins (S401), the data is transmitted to an intermediary server, such as the instant message host device 130 or the advertising content server 140 (S402), and a context of the data is determined at the intermediary server (S404), such as by using key words. The advertising content is selected at the intermediary server based upon the context of the textual data (S405), and the advertising content is transmitted from the intermediary server to the instant message sender (S406), thereby ending process 209 (S407).

The intermediary server may be the instant message host device 130, the advertising content server 140, or another device. The content tracking component 146 may analyze the instant messages sent between the instant message sender and the instant message recipient. For example, if the instant messages include the words "soccer," "game," and "practice," the content tracking component 146 may determine that the instant message recipient is interested in soccer and the advertising content server 140 sends advertising content related to soccer to the instant message sender device 110. The advertising content may be selected from, for example, the advertising content store 142 described above with respect to FIG. 1.

The advertising content may be selected based on attributes in a user profile associated with the instant message sender. A user profile associated with the instant message sender may be included in the user profile store 147 on the advertising content server 140. The user profile may include the user's demographic information, such as the user's age, gender, and place of residence. For example, the user profile may indicate that the instant message sender is male, 25 years old, and lives in New York. Based on this information, the advertising selection component 144 may select advertising content related to an upcoming NEW YORK YANKEES™ baseball game at Yankee Stadium.

In still another example, the instant message session content tracking component 146 may analyze the instant messages sent by the instant message sender to determine the context of the instant messages. The advertising selection component 144 may use the determined content information to select advertising content from the advertising content store 142 that is relevant to the content of the instant messages. In yet another example, the advertising selection component may use the advertising configuration settings 145 to select appropriate advertising content from the advertising content store 142. The advertising configuration settings 145 include information related to the display of advertising content such as how often a particular provider of advertising content should be transmitted to an instant message sender.

In yet another example, the intermediary server may access a user profile associated with the instant message sender and use the settings in the user profile to select advertising content relevant to the instant message sender. The user profile may be the user profile store 147. The advertising selection component 144 may select advertising content from the advertising content store 142 based on an attribute stored in a user profile associated with the instant message sender and included in the user profile store 147. For example, the user profile store 147 may include user attributes such as a user's favorite products or services.

In another example, the user profile store may include user attributes such as the maximum number of times that particular advertising content is to be delivered to a user during a preset temporal period. The values of the attributes in the user profile may be specified by the user, by the provider of the advertising content, by the instant message sender user interface (S207), or from the content of the instant messages sent by the user.

The values of the attributes may be inferred from the number of times a user selects a particular displayed advertising content. For example, if an instant message sender selects most ads related to coffee, but rarely selects ads related to other products, that user's profile may automatically indicate that coffee is the user's favorite product. For example, the user profile may include an attribute "Favorite Product," which is set to "coffee" for the instant message sender. Based on this attribute value, the advertising selection component 144 selects a coffee-related advertising content to send to the user for display in the conversation window when the user accepts data for transmission as an instant message.

In other implementations, generating advertising content may include retrieving advertising content that is stored locally. For example, the advertising content may be stored on the instant message sender device 110. In yet another example, the advertising content may be sent with an instant message received by the instant message sender device 110 from the instant message recipient device 120. When the sender and recipient have similar interests, the advertising content may be selected to reflect those interests. In some implementations, shared interests may be indicated by the sender and recipient's profiles or by the content of the messages transmitted between the sender and the recipient.

The generated advertising content may include text, video, image, graphical, or any other type of content. The generated advertising content may include more than one type of content, and more than one instance of a particular type of content. For example, the advertising content may include more than one image, and the images may be different sizes. The image may change size when the user selects the image, or the image may be animated.

A counter may be incremented based upon generating the advertising content (S210). In the situation where particular advertising content is to be delivered to a user every Nth time the user participates in an instant messaging session, or where the provider of advertising content may be concerned about instant message session participants becoming saturated or annoyed by advertising content, the counter feature can be used. Using this feature, providers of advertising content may specify that particular users be provided with advertising content every Nth instant messaging session.

The advertising content is displayed in the conversation window of the graphical user interface independently of the instant message (step 211). The advertising content is displayed in the conversation window after the instant message sender has accepted data for transmission as an instant message. Generally, the instant message sender's attention is focused on the conversation window immediately after accepting data for transmission because the instant message sender is watching for the instant message recipient's reply. Thus, displaying the advertising content in the conversation window after the instant message sender accepts data for transmission increases the instant message sender's exposure to and potential absorption of the advertising content.

In one implementation, the advertising content is displayed, altered or not displayed based upon the counter. For instance, if the number of times a user has seen particular advertising content exceeds a particular threshold, a smaller or faster variant of the advertising content may be displayed, or the advertising content may removed or not be displayed.

The advertising content is displayed independently of the instant message. In some implementations, the advertising content is be displayed independently of the instant message by displaying it in a portion of the conversation window where the instant message does not appear. In other implementations, the advertising content is displayed independently of the instant message by displaying the advertising content at a different time than the instant message, or by displaying the content out-of-line with the instant message. For example, the advertising content may be displayed immediately after the transmitted instant message is displayed in the conversation window. Regardless of the independent display of the advertising content, the advertising content, or a portion of the advertising content, may obscure a portion of the instant messages displayed in the conversation window.

The advertising content may include more than one image. The images may relate to similar subject matter. In this implementation, one of the images may be shown in the conversation window immediately after the instant message sender transmits an instant message. Another image from the same advertising content may be displayed in the conversation window after a predetermined amount of time. For example, a second image may be displayed in the portion of the conversation window where the first image was displayed within ten seconds of the display of the first image. In some implementations, the second image may continue to be displayed in the conversation window until the instant message communications session is terminated.

Figure 5:
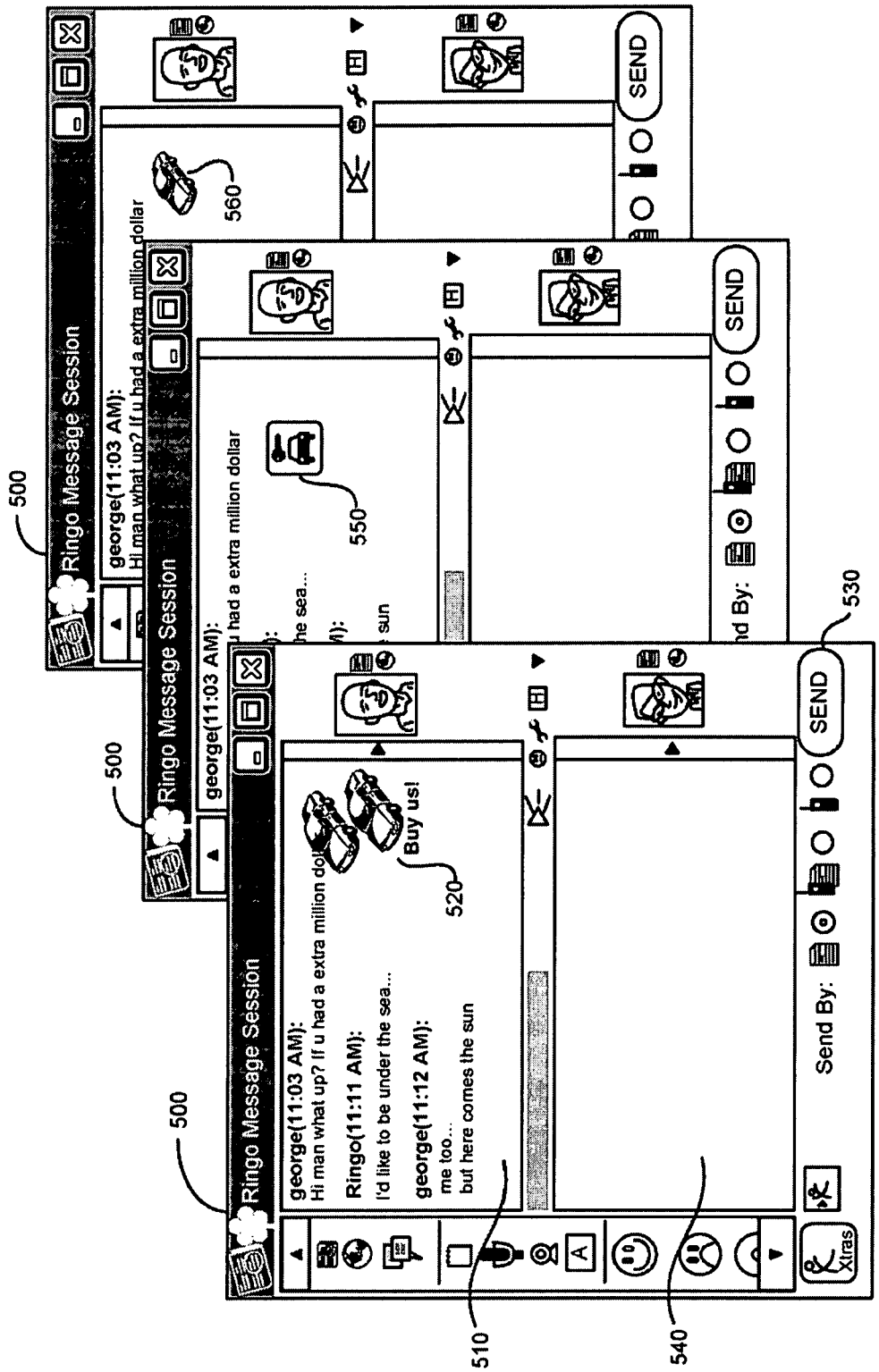

FIG. 5 shows an example of an instant messaging application user interface 500 that displays advertising content in a conversation window of the user interface 500 during an instant messaging communications session. The user interface 500 may be displayed to an instant message sender on the instant message sender device 110. FIG. 5 illustrates the user interface 500 at three different times during the instant messaging communications session. The user interface 500 includes a conversation window 510 that may display the text of a conversation between participants of the instant messaging communications session. As discussed above, the conversation window may display the instant messages received from another instant message session participant.

The conversation window 510 also includes the advertising content 520. Display of the advertising content 520 is triggered by an instant message participant sending a message. An instant message participant may send a message by, for example, pressing a send control 530, which is also included within the user interface 500. The user interface 500 also includes a compose window 540 in which a participant in the instant messaging communications session may compose a message. During the instant messaging communications session, the advertising image 520 may be replaced by subsequent advertising images. In the example shown in FIG. 5, the advertising content 520 includes multiple advertising images. In particular, the advertising content 520 is replaced by advertising images 550 and 560.

Replacement of the advertising content 520 with the advertising image 550 may be triggered by the passage of a predetermined amount of time measured from when the advertising content 520 was first displayed. In another implementation, the advertising content 520 may be replaced with the advertising image 550 in response to a user input related to the advertising content 520. For example, the trigger may be the user selecting the advertising content with an input device, such as a mouse. In another example, the trigger may be the receipt or transmission of a subsequent instant message from or to the instant message recipient. In yet another example, the trigger may be the input of a message by the instant message sender without the message necessarily being transmitted. Similar triggers may cause the advertising image 550 to transition to the advertising image 560. For example, the trigger may be the passage of a predetermined amount of time since the advertising content 520 was displayed or the passage of a predetermined amount of time since the advertising content 550 was displayed. This trigger that results in the transition from advertising image 550 to advertising content 560 may be the same or different than that which caused the transition of the advertising content 520 to the advertising image 550.

The advertising images 550 and 560 are of different sizes, and the advertising images 550 and 560 may be shown within a short period of time, such as ten seconds after the display of the advertising content 520. The advertising images 550 and 560, or the advertising content 520, may cover a portion of the dialog shown in the conversation window 510. In the example shown, the advertising content 520 and the advertising image 550 cover a portion of the dialog. However, the advertising image 560, which may remain in the conversation window 510 until the instant message session is terminated, does not cover any of the dialog in the example shown.

This configuration may result in the advertising content being less obtrusive to the instant message sender, while also remaining in the conversation window 510 of the user interface 500 where the instant message sender's attention is focused. In some implementations, the advertising image 560 may be a clickable image that the instant message recipient may select with a mouse or other input device. In other implementations, the instant message sender may elect to remove the advertising image 560.

Referring now to FIGS. 6A-6F, an instant messaging user interface 500 transitions between having no advertising content in the conversation window, having advertising content in the conversation window, and removal of the advertising content. The user interface 500 includes the conversation window 510 and the compose window 540. In the examples shown in FIGS. 6A-6F, the user interface 500 is displayed to the instant message sender, "george," in this example and in the example discussed above with respect to FIG. 5. However, in other examples, the user interface 500 may be displayed to the instant message recipient (e.g., "Ringo" in this example and the example discussed with respect to FIG. 5). In the examples shown in FIGS. 6A-6F, the instant message sender inputs a message to send to the instant message recipient. However, these examples also apply to a situation in which a message is received by the instant message sender except that, in that situation, the received text would be displayed only in the conversation window 510 rather than one or more of the conversation window 510 and the compose window 540.

Figure 6A:
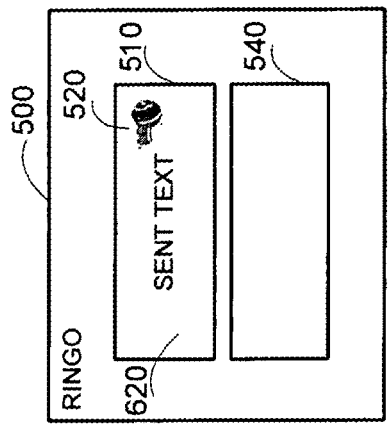
FIG. 6A-6F illustrates a series of exemplary instant message user interfaces.

Beginning with FIG. 6A, the user interface 500 is rendered in response to the instant message sender selecting Ringo as the recipient of an instant message. The example shown in FIG. 6A is before the instant message sender has input an instant message for transmission to the instant message sender. At this time, neither the conversation window 510 nor the compose window 540 includes instant message text.

Figure 6B:
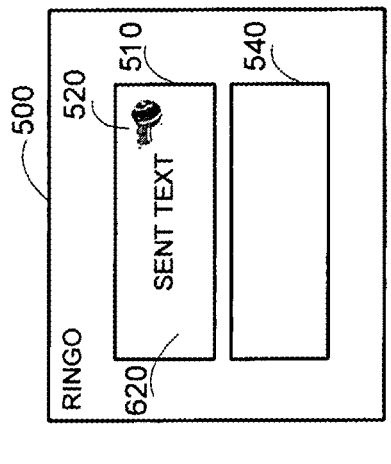
Figure 6C:
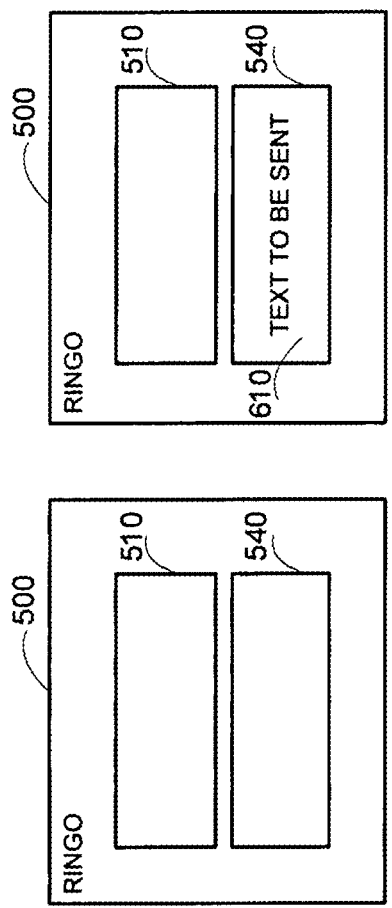

Referring to FIG. 6B, the instant message sender has entered text to be sent as an instant message 610 to the instant message recipient into the compose window 540. Once the instant message sender selects to communicate the text to the instant message recipient, the instant message text 610 displayed in the compose window 540 of FIG. 6B may be displayed in the conversation window 510, as shown in FIG. 6C. FIG. 6C also includes the advertising content 520 within the conversation window 510. As discussed above, the display of the advertising content 520 may be triggered by the instant message sender sending the instant message. In other implementations, the display of the advertising content 520 may be triggered by the receipt of an instant message from the instant message sender. In still other implementations, the display of the advertising content 520 may be triggered by the instant message sender entering the instant message text 610 without necessarily sending it to the instant message recipient.

Figure 6D:
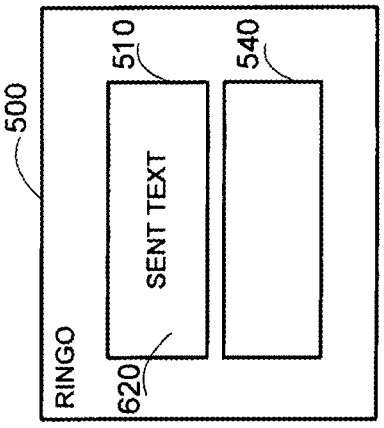

As discussed above with respect to FIG. 5, the advertising content 520 may include multiple advertising images, or other types of advertising content, such that the advertising content 520 may be replaced with other advertising images. As shown in FIG. 6D, the advertising content 520 may transition into the advertising image 550 upon the passage of a predetermined amount of time as measured from the initial display of the advertising content 520. For example, the advertising content 520 of FIG. 6C may be displayed for ten seconds. Thus, in the example shown in FIG. 6C, the user interface 500 represents a snapshot of the instant messaging communications session that is prior to the passage of the predetermined amount of time. After the advertising content 520 has been displayed for ten seconds, the advertising content 520 transitions to the advertising image 550, as shown in FIG. 6D.

Other triggering events may cause the advertising content 520 to transition to the advertising image 550. For example, the advertising content 520 may be set to transition to another instance of advertising content, or to expire, upon the occurrence of a predefined event. For example, the advertising content 520 may transition to the advertising image 550 after the advertising content 520 has been displayed for a predetermined amount of time. In another example, the advertising content 520 may transition to the advertising image 550 upon receipt of a subsequent instant message from the instant message sender.

Figure 6E:
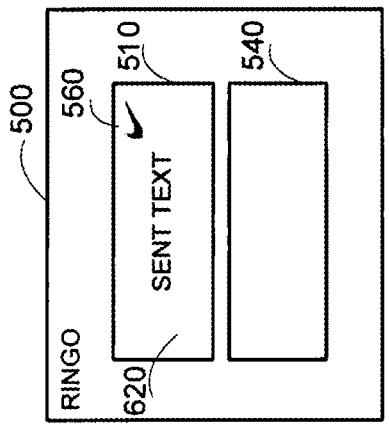

Similarly, and as shown in FIG. 6E, the advertising image 550 transitions to the advertising image 560 upon occurrence of a second triggering event. The second triggering event may be, for example, the passage of a predetermined amount of time as measured from the initial display of the advertising image 550. In another example, the second triggering event may be the receipt or sending of a subsequent instant message. In yet another example, the second triggering event may be receipt of a user input selecting the advertising image 550 with a mouse or other input device. Although not shown, additional advertising images may be included in the advertising content 520 and shown at subsequent times during the instant messaging communications session.

Figure 6F:
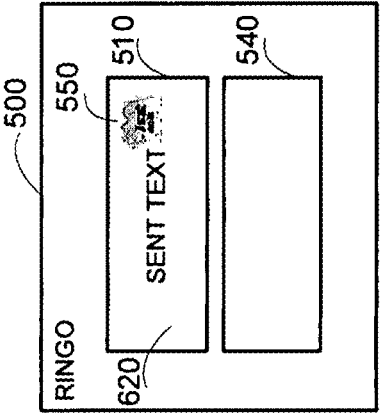

Referring now to FIG. 6F, the advertising image 560 is no longer displayed in the conversation window 510 although the instant messaging session may still be in progress. The advertising image 560 may have been removed from the conversation window 510 in response to a triggering event.

Similar to the transitioning between advertising content 520 and advertising images 550 and 560, the advertising image 560 may be removed from the conversation window 510 after a predetermined time measured from when the advertising image 560 was initially displayed in the conversation window 510. Alternatively, the predetermined time may be measured from when the initial advertising content was displayed in the conversation window 510. In this example, the advertising image 560 may be considered to have "expired." In another example, the advertising image 560 may be removed as a result of a user input specifying that the advertising image 560 be removed from the conversation window 520. In yet another example, the advertising image 560 may be removed from the conversation in response to receiving a subsequent instant message from the instant message recipient or transmitting a subsequent instant message to the instant message recipient. In still another example, the advertising image 560 may be removed from the conversation window in response to the instant messaging session being terminated. Although the example shown in FIG. 6F illustrates that the advertising image 560 may be removed from the conversation window 510 during the instant messaging communications session, in some implementations the advertising image 560 remains in the conversation window 510 throughout the instant messaging communications session.

Returning to FIG. 2, if the displayed advertising content are selectable by the user, a user input selecting the advertising content may be received (S212). The images may be selected by, for example, the user pressing a mouse, or other pointing device, or through a keyboard selection. The selectable images may be "clickable" images that, when selected by a user, direct a browser on the user's computer to an address associated with the provider of the advertising content (S214).

The advertising content tracking component 148 may record data indicating whether the recipient of the advertising content selects the advertising content. This information may be provided to the provider of the advertising content and used as a gauge of the recipient's reaction to the advertising content, and when aggregated, as a gauge of the reaction of all recipients of the advertising content. The STARBUCKS® coffee advertising content may include a "clickable" image that the recipient may select using a mouse or other pointing device. When the recipient clicks on the image, a browser window on the recipient's computer may be directed to the STARBUCKS® coffee web site, or a special promotional website associated with STARBUCKS® coffee. The advertising content tracking component 148 may then record an indication that the recipient clicked on the STARBUCKS® coffee advertising content, using a counter.

The user's selection of the advertising content may increment a counter based on the user's selection (S215). The number of selections of the advertising content is determined based on the counter (S216), and the determined number is sent to the provider of the advertising content (S217). This information may be used by the provider to assess the effectiveness of advertising content. Alternatively, if the user does not select the advertising content (S212), some or all of these functions may be omitted.

The advertising tracking component 148 may include an entry for the instant message sender that includes data related to the number of times the instant message sender has selected a particular item of advertising content and a history of advertising content transmission to the instant message sender. The history of advertising content transmission may include a time and date stamp for each item of advertising content that has been sent to the instant message sender. This information enables the advertising content server 140 to ensure that the instant message sender is not inundated with advertising content that may annoy the instant message sender.

Information in the advertising tracking component 148 that be updated with includes the time that the advertising content was transmitted, the instant message sender that the advertising content was transmitted to, and an identifier indicating the advertising content transmitted. For example, the advertising content selection component 144 may select STARBUCKS® coffee advertising content in step 430 based on an instant message from an instant message sender "Alex" that includes the words "coffee," "latte," and "tired." After transmitting the selected STARBUCKS® coffee advertising content to the instant message sender, the advertising tracking component 148 may be updated to reflect that a STARBUCKS® coffee advertising content was transmitted to the instant message sender device 110 and displayed in the instant messaging user interface in response to the instant message sender accepting data for transmission as an instant message. This information may be used to ensure that a particular instant message sender is not inundated with advertising content.

The advertising content may be removed from the conversation window at any time during the communications session based on receiving a user input indicating that the advertising content should be removed (S219). When this user input is received, the advertising content is removed from display (S220). The advertising content and/or the data may be transmitted to the instant message recipient (S221), where the advertising content and/or the data may be displayed at the instant message recipient (S222).

The instant message communications session may be terminated by, for example, either the instant message sender or the instant message recipient logging off of the instant message host device 130. Alternatively, the communications session may be terminated by the non-response of either the instant message sender or the instant message recipient to an instant message after a predetermined amount of time. When the instant message communications session is terminated (S224), the advertising content is removed from display (S225), thereby ending process 200 (S236).

Figure 7:
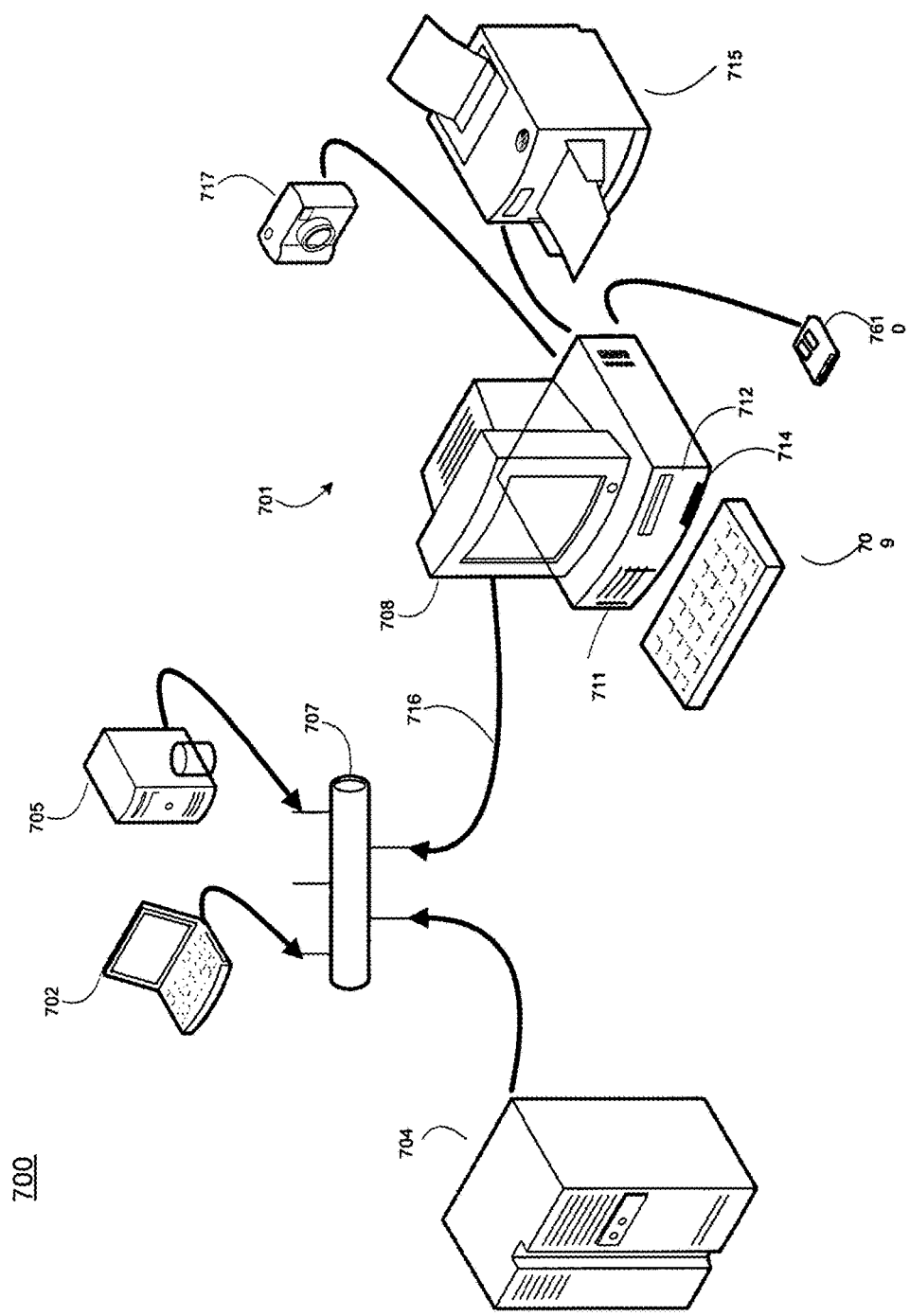
FIG. 7 depicts the exterior appearance of an exemplary communications system, including a computer.

FIG. 7 depicts the exterior appearance of an exemplary system 700, including a computer 701 that implements an instant message sender device such as instant message sender device 110, and a computer 702 that implements an instant message recipient device such as instant message recipient device 120. The example system 700 also includes a server 704 that implements an instant message host device such as instant message host device 130, and a server 705 that implements an advertising content server such as advertising content server 140.

In more detail, the computer 701 is connected to computer 702, and servers 704 and 705, via a network 707. As shown in FIG. 1, the hardware environment of the computer 701 includes a display monitor 708 for displaying text and images to a user, a keyboard 709 for entering text data and user commands into the computer 701, a mouse 710 for pointing, selecting and manipulating objects displayed on the display monitor 708, a fixed disk drive 711, a removable disk drive 712, a tape drive 714, a hardcopy output device 715, a computer network connection 716, and a digital input device 717.

The display monitor 708 displays the graphics, images, and text that comprise the user interface for the software applications used by the system 700, as well as the operating system programs necessary to operate the computer 701. A user uses the keyboard 709 to enter commands and data to operate and control the computer operating system programs as well as the application programs. The user uses the mouse 710 to select and manipulate graphics and text objects displayed on the display monitor 708 as part of the interaction with and control of the computer 701 and applications running on the computer 701. The mouse 710 may be any type of pointing device, and may be a joystick, a trackball, a touch-pad, or other pointing device. Furthermore, the digital input device 717 allows the computer 701 to capture digital images, and may be a scanner, a digital camera, a digital video camera, or other digital input device. Software used to provide for conditional advertising for instant messaging is stored locally on computer readable memory media, such as the fixed disk drive 711.

In a further implementation, the fixed disk drive 711 itself may include a number of physical drive units, such as a redundant array of independent disks ("RAID"), or may be a disk drive farm or a disk array that is physically located in a separate computing unit. Such computer readable memory media allow the computer 701 to access computer-executable process steps, application programs and the like, stored on removable and non-removable memory media.

The computer network connection 716 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 707 may be a LAN network, a corporate or government WAN network, the Internet, or other network. The computer 701 is directly or indirectly coupled to the computer 702, and/or the servers 704 and 705 via network 707, so as to effectuate unidirectional or bi-directional transmission of data between the computers 701 and 702 and/or the servers 704 and 705.

The computer network connection 716 may be a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wireline connectors include, for example, a IEEE®-1394 FIREWIRE® connector, a Universal Serial Bus ("USB") connector, a serial port connector, a parallel port connector, or other wireline connector.

The removable disk drive 712 is a removable storage device that is used to off-load data from the computer 701 or upload data onto the computer 701. The removable disk drive 712 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 711 or on removable media for the removable disk drive 712.

The tape drive 714 is a tape storage device that is used to off-load data from the computer 701 or to upload data onto the computer 701. The tape drive 714 may be a quarter-inch cartridge ("QIC"), 4 mm digital audio tape ("DAT"), 8 mm digital linear tape ("DLT") drive, or other type of tape.

The hardcopy output device 715 provides an output function for the operating system programs and applications. The hardcopy output device 715 may be a printer or any output device that produces tangible output objects, including textual or image data or graphical representations of textual or image data. While the hardcopy output device 715 is depicted as being directly connected to the computer 701, it need not be. For instance, the hardcopy output device 715 may be connected to computer 701 via a network interface, such as a wireline or wireless network.

The servers 704 and 705 exist remotely on a network, and include one or more networked data server devices or servers. The servers 704 and 705 execute software which services requests sent by the computers 701 and 702, where the servers 704 and 705 may each include a server farm, a storage farm, or a storage server. In an alternate implementation, one or more of the servers 704 and 705 are omitted, and/or the functions associated with the servers 704 and 705 are actually performed by the computer 701 and/or 702.

Furthermore, although the computer 701 is illustrated in FIG. 7 as a desktop PC, in further implementations the computer 701 may be a laptop, a workstation, a midrange computer, a mainframe, an embedded system, telephone, a handheld or tablet computer, a PDA, or other type of computer.

Although further description of the components which make up the computer 702 and the servers 704 and 705 is omitted for the sake of brevity, it suffices to say that the hardware environment of the computer or individual networked computers which make up the computer 702 and the servers 704 and 704 is similar to that of the exemplary hardware environment described herein with regard to the computer 701. In an alternate implementation, the functions of the computers 701 and 702 and/or the servers 704 and 705 are combined in a single, combined hardware environment.

Figure 8:
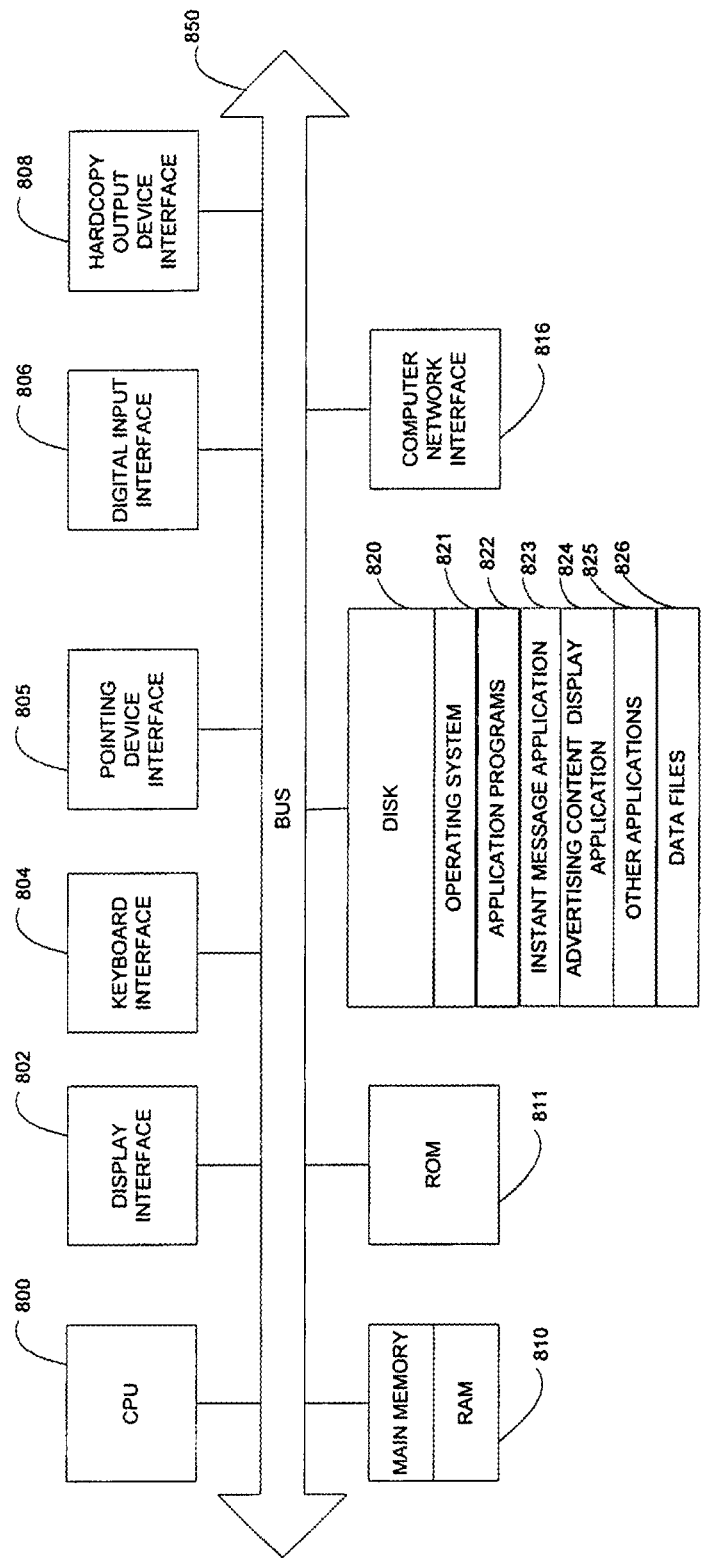
FIG. 8 depicts an example of an internal architecture of the computer of FIG. 7.

FIG. 8 depicts an example of an internal architecture of the computer 701. The computing environment includes a computer central processing unit ("CPU") 800 where the computer instructions that comprise an operating system or an application are processed; a display interface 802 which provides a communication interface and processing functions for rendering graphics, images, and texts on the display monitor 708; a keyboard interface 804 which provides a communication interface to the keyboard 709; a pointing device interface 805 which provides a communication interface to the mouse 710 or an equivalent pointing device; a digital input interface 806 which provides a communication interface to the digital input device 717; a hardcopy output device interface 808 which provides a communication interface to the hardcopy output device 715; a random access memory ("RAM") 810 where computer instructions and data are stored in a volatile memory device for processing by the computer CPU 800; a read-only memory ("ROM") 811 where invariant low-level systems code or data for basic system functions such as basic input and output ("I/O"), startup, or reception of keystrokes from the keyboard 709 are stored in a non-volatile memory device; and optionally a storage 820 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 821, application programs 822 (including instant message application 823, advertising content display application 824, and other applications 825 as necessary) and data files 826 are stored; a computer network interface 816 which provides a communication interface to the network 707 over the computer network connection 716. The constituent devices and the computer CPU 800 communicate with each other over the computer bus 850.

The RAM 810 interfaces with the computer bus 850 so as to provide quick RAM storage to the computer CPU 800 during the execution of software programs such as the operating system application programs, and device drivers. More specifically, the computer CPU 800 loads computer-executable process steps from the fixed disk drive 711 or other memory media into a field of the RAM 810 in order to execute software programs. Data is stored in the RAM 810, where the data is accessed by the computer CPU 800 during execution.

Also shown in FIG. 8, the computer 701 stores computer-executable code for an operating system 821, application programs 822 such as word processing, spreadsheet, presentation, gaming, or other applications. Although it is possible to provide conditional advertising for instant messaging using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 800 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 700 is more than one processing unit, including a multiple CPU configuration found in high-performance workstations and servers, or a multiple scalable processing unit found in mainframes.

The operating system 821 may be MICROSOFT® WINDOWS VISTA®/WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 721 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT® .NET Compact.

Although further description of the internal architecture of the servers 704 and 705 is omitted for the sake of brevity, it suffices to say that the architectures are similar to that of the computer 701. In an alternate implementation, where the functions of the computers 701 and 702 and/or the servers 704 and 704 are combined, the internal architectures may also be combined or duplicated.

While FIGS. 7 and 8 illustrate one possible implementation of a computing system that executes program code, or program or process steps, configured to effectuate conditional advertising for instant messaging, other types of computers may also be used as well.

The arrangements have been described with particular illustrative implementations. It is to be understood that the concepts are not however limited to the above-described implementations, and that various changes and modifications may be made.

What is claimed is:

1. A computer-implemented method for displaying advertising content in an instant messaging user interface, the method comprising the following operations performed by at least one processor:
   rendering an instant message sender user interface for an instant messaging communications session involving an instant message sender and an instant message recipient;
   receiving, as user input entered by the instant message sender through manipulation of the instant message sender user interface, data for transmission as an instant message from the instant message sender to the instant message recipient;
   determining contextual information corresponding to advertising content previously viewed by the instant message sender;
   generating a value of an attribute of the instant message sender based on the contextual information;
   selecting advertising content based on the value of the attribute; and
   generating, based on a count value indicative of an activity of the instant message sender, an instruction to display the selected advertising content during at least a portion of the time that the instant message sender awaits receipt of a reply from the instant message recipient.

2. The method of claim 1, further comprising generating an instruction to display the selected advertising content separately from instant messages within a conversation window of the instant message sender user interface.

3. The method of claim 2, wherein generating the instruction to display the advertising content separately from the instant messages comprises displaying the advertising content in a first portion of the conversation window and displaying the instant messages in a second portion of the conversation window.

4. The method of claim 2, wherein generating the instruction to display the advertising content separately from the instant messages comprises displaying the advertising content out-of-line with the instant messages.

5. The method of claim 1, further comprising selecting advertising content for display in a conversation window of the instant message sender user interface based on content within the user input.

6. The method of claim 1, further comprising
   receiving an instant message communicated from the instant message recipient; and
   generating an instruction to alter the displayed advertising content based on receiving the instant message communicated from the instant message recipient.

7. The method of claim 6, wherein generating the instruction to alter the displayed advertising content comprises locating the advertising content in another portion of a conversation window of the instant message sender user interface.

8. The method of claim 6, wherein altering the displayed advertising content comprises changing the shape of the advertising content.

9. The method of claim 6, wherein generating the instruction to alter the displayed advertising content comprises generating an instruction to remove the advertising content from a conversation window of the instant message sender user interface.

10. The method of claim 1, further comprising receiving an instant message communicated from the instant message recipient, wherein the advertising content is displayed upon receipt of the instant message communicated from the instant message recipient.

11. The method of claim 1, wherein the advertising content includes at least first and second images, and wherein generating the instruction to display the advertising content further comprises:
    generating a first instruction to display the first image; and
    generating a second instruction to replace the first image with the second image.

12. The method of claim 11, wherein the first image is larger than the second image.

13. The method of claim 11, further comprising:
    terminating the communications session; and
    generating a third instruction to remove the second image from display based upon terminating the communications session.

14. The method of claim 11, wherein generating the second instruction to replace the first image with the second image occurs within a predetermined amount of time after generating the first instruction to display the first image.

15. The method of claim 1, wherein the advertising content includes at least one transparent image.

16. The method of claim 1, wherein the advertising content is animated advertising content.

17. The method of claim 1, further comprising generating an instruction to transmit the advertising content and the data to the instant message recipient.

18. The method of claim 1, wherein:
    the advertising content is displayed in a conversation window of the instant message sender user interface; and
    the displayed advertising content obscures at least a portion of an instant message communicated from the instant message recipient.

19. The method of claim 1, further comprising:
    accessing a user profile stored on an intermediary server; and
    retrieving the attribute from the user profile, wherein the advertising content is determined based on the retrieved attribute.

20. The method of claim 1, further comprising incrementing the count value based upon generation of the selected advertising content.

21. The method of claim 1, further comprising receiving a user input selecting the advertising content.

22. The method of claim 21, wherein the advertising content expands within a conversation window of the instant message sender user interface in response to the received user input.

23. The method of claim 21, further comprising directing a browser to an address associated with the advertising content based upon receiving the user input.

24. The method of claim 21, further comprising:
    incrementing a counter based upon receiving the user input;
    determining a number of selections of the advertising content based on the counter; and
    sending the determined number to a provider of the advertising content.

25. The method of claim 1, further comprising:
    receiving a user input to remove the advertising content from a conversation window of the instant message sender user; and
    generating an instruction to remove the advertising content from display in response to receiving the user input.

26. The method of claim 25, further comprising generating an instruction to present a set of selectable options related to the display of advertising content, the set of options including an option to remove the advertising content from the conversation window.

27. The method of claim 25, further comprising preventing the display of advertising content in subsequent instant messaging communications sessions based on the received user input.

28. The method of claim 26, wherein the set of options is presented before the advertising content is displayed in a conversation window of the instant message sender user interface.

29. The method of claim 26, wherein the set of options is presented after the advertising content is displayed in a conversation window of the instant message sender user interface.

30. The method of claim 26, wherein the set options is presented before the advertising content is displayed.

31. The method of claim 26, wherein the set of options is presented after the advertising content is displayed.

32. The method of claim 1, further comprising generating an instruction to display a banner advertising content on the instant message sender user interface.

33. The method of claim 1, further comprising generating an instruction to display instant messages communicated from the instant message sender within a conversation window of the instant message sender user interface.

34. A device for displaying advertising content in an instant messaging user interface, the device comprising:
 an output device configured to:
  render an instant message sender user interface for an instant messaging communications session involving an instant message sender and an instant message recipient; and
  display, based on a count value indicative of an activity of the instant message sender, advertising content in the conversation window during at least a portion of a time that the instant message sender awaits receipt of a reply from the instant message recipient;
 an input device configured to receive, as user input entered by the instant message sender through manipulation of the instant message sender user interface, data for transmission as an instant message from the instant message sender to an instant message recipient; and
 a processor configured to:
  determine contextual information corresponding to advertising content previously viewed by the instant message sender;
  generate a value of an attribute of the instant message sending based on the determined contextual information; and
  select advertising content based on the value of the attribute.

35. A computer-implemented method for displaying advertising content in an instant messaging user interface, the method comprising the following operations performed by at least one processor:
 receiving, as user input entered by an instant message sender through manipulation of an instant message sender user interface, data for transmission as an instant message from the instant message sender to an instant message recipient;
 determining contextual information corresponding to advertising content previously viewed by the instant message sender;
 generating a value of an attribute of the instant message sending based on the determined contextual information;
 selecting advertising content based on the value of the attribute; and
 while the instant messaging session continues and during at least a portion of the time that the instant message sender awaits a display of a reply from the instant message recipient, generating instructions to:
  display the data entered by the instant message sender in a first portion of a conversation window of the instant message sender user interface;
  display, based on a count value indicative of an activity of the instant message sender, the first advertising content in a second portion of the conversation window that is adjacent to the first portion;
  remove the first advertising content from the second portion of the conversation window while the display of the data entered by the instant message sender persists;
  display second advertising content based on the value of the attribute in the second portion of the conversation window, the second advertising content being different from the first advertising content, and
  remove the second advertising content from the first portion of the conversation window.

36. The method of claim 35, wherein the display of the second advertising content is triggered by receipt of additional data from one of the instant message sender or the instant message recipient.

37. A computer-implemented method for displaying advertising content in an instant messaging user interface, the method comprising the following operations performed by at least one processor:
 receiving, as user input entered by an instant message sender through manipulation of an instant message sender user interface, data for transmission as an instant message from the instant message sender to an instant message recipient;
 determining contextual information corresponding to advertising content previously viewed by the instant message sender; and
 generating a value of an attribute of the instant message sending based on the determined contextual information;
 selecting advertising content for display in the conversation window based on content within the user input to be transmitted and based on the value of the attribute;
 generating an instruction to display, based on a count value indicative of an activity of the instant message sender, the advertising content during at least a portion of the time that the instant message sender awaits receipt of a reply from the instant message recipient, the advertising content being displayed separately from an instant message;
 receiving an instant message communication from the instant message recipient; and
 generating an instruction to alter the displayed advertising content based on receiving the instant message communication from the instant message recipient.

38. A computer-implemented method for displaying advertising content in an instant messaging user interface, the method comprising the following operations performed by at least one processor:
 receiving, as user input entered by the instant message sender through manipulation of an instant message sender user interface, data for transmission as an instant message from the instant message sender to an instant message recipient;
determining contextual information corresponding to advertising content previously viewed by the instant message sender;
generating a value of a attribute of the instant message sender based on the determined contextual information;
selecting first advertising content for display on the instant message sender user interface based on the value of the attribute;
determining whether the first advertising content has been previously selected by the instant message sender in a previous instant messaging communications session;
identifying first advertising selection frequency associated with the first advertisement based on a determination that the first advertising content has been previously selected by the instant message sender;
providing instructions to send second advertising content having a same content category as the first advertising content when the first advertising selection frequency is greater than a threshold value; and
providing instructions to send third advertising content having a different content category as the first advertising content the first advertising selection frequency is less than the threshold value.

39. The method of claim 38, wherein at least one of the second or third advertising content is displayed separately from the instant messages.

40. The method of claim 39, wherein providing the instructions to display the second or third advertising content separately from the instant messages comprises providing instructions to display the second or third advertising content in a first portion of a conversation window of the instant message sender user interface and to display the instant messages in a second portion of the conversation window.

41. The method of claim 38, further comprising selecting the second or third advertising content based on content within the user input to be transmitted.

42. The method of claim 38, further comprising:
receiving an instant message communicated from the instant message recipient; and
generating an instruction to alter the second or third advertising content based on the received instant message communicated from the instant message recipient.

43. A computer-implemented method for displaying advertising content in an instant messaging user interface, the method comprising the following operations performed by at least one processor:
receiving as user input entered by the instant message sender through manipulation of an instant message sender user interface, data for transmission as an instant message from the instant message sender to an instant message recipient;
determining contextual information corresponding to advertising content previously viewed by the instant message sender;
generating a value of an attribute of the instant message sender based on the determined contextual information;
selecting first advertising content for display on the instant message sender user interface based on the attribute value;
determining whether the first advertising content has been previously displayed to the instant message sender in a previous instant messaging communications session;
identifying first advertising display frequency associated with the first advertisement;
providing instructions to send second advertising content having a same content category as the first advertising content for display when the first advertising display frequency is less than a threshold value; and
providing instructions to send third advertising content having a different content category as the first advertising content for display when the first advertising display frequency is greater than the threshold value.

44. The method of claim 43, wherein at least one of the second or third advertising content is displayed separately from the instant messages.

45. The method of claim 44, further comprising generating instructions to display the second or third advertising content in a first portion of a conversation window of the instant message sender user interface and to display the instant messages in a second portion of the conversation window.

46. The method of claim 43, further comprising selecting the second or third advertising content based on content within the user input to be transmitted.

47. The method of claim 43, further comprising:
receiving an instant message communicated from the instant message recipient; and
generating an instruction to alter the second or third advertising content based on the received instant message communicated from the instant message recipient.

48. The method of claim 1, wherein the attribute comprising at least one of a product or service favored by the instant message sender.

49. The method of claim 1, wherein:
obtaining a user-defined rule defining one or more preferences of the instant message sender regarding advertisement content; and
selecting the advertising content based on the user-defined rule.

50. The method of claim 38, further comprising rendering the instant message sender user interface for an instant messaging communications session involving the instant message sender and the instant message recipient, the instant message sender user interface comprising a conversation window, and the conversation window being configured to display instant messages communicated from the instant message recipient to the instant message sender.

51. The method of claim 38, wherein the attribute comprising at least one of a product or service favored by the instant message sender.

52. The method of claim 38, wherein:
obtaining a user-defined rule defining one or more preferences of the instant message sender regarding advertisement content; and
selecting the advertising content based on the user-defined rule.

53. The method of claim 1, further comprising:
identifying an element of the contextual information;
determining a frequency at which the element of contextual information appears within the previously-viewed advertising content; and
generating the attribute value based on the determined frequency.

* * * * *

UNITED STATES PATENT AND TRADEMARK OFFICE
CERTIFICATE OF CORRECTION

PATENT NO. : 9,715,677 B2
APPLICATION NO. : 11/781484
DATED : July 25, 2017
INVENTOR(S) : Orey Gilliam It is certified that error appears in the above-identified patent and that said Letters Patent is hereby corrected as shown below:

In the Claims

In Claim 30, Column 23, Line 19, "set options" should read --set of options--.

In Claim 34, Column 23, Lines 51-52, "instant message sending" should read --instant message sender--.

In Claim 35, Column 24, Lines 1-2, "instant message sending" should read --instant message sender--.

In Claim 37, Column 24, Lines 44-45, "instant message sending" should read --instant message sender--.

In Claim 38, Column 25, Line 7, "a attribute" should read --an attribute--.

In Claim 38, Column 25, Line 26, "content the first advertising selection" should read --content when the first advertising selection--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*